(12) United States Patent
Laffi

(10) Patent No.: US 10,327,593 B2
(45) Date of Patent: Jun. 25, 2019

(54) METHOD OF OPERATING A GRINDER

(71) Applicant: KONINKLIJKE PHILIPS N.V., Eindhoven (NL)

(72) Inventor: Nicola Laffi, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 240 days.

(21) Appl. No.: 14/768,841

(22) PCT Filed: May 16, 2014

(86) PCT No.: PCT/IB2014/061483
§ 371 (c)(1),
(2) Date: Aug. 19, 2015

(87) PCT Pub. No.: WO2014/184777
PCT Pub. Date: Nov. 20, 2014

(65) Prior Publication Data
US 2016/0058244 A1    Mar. 3, 2016

(30) Foreign Application Priority Data

May 16, 2013 (EP) .................................. 13168130.6

(51) Int. Cl.
*A47J 42/00*    (2006.01)
*A47J 42/44*    (2006.01)
*A47J 31/42*    (2006.01)

(52) U.S. Cl.
CPC ............... *A47J 42/44* (2013.01); *A47J 31/42* (2013.01); *A47J 42/00* (2013.01)

(58) Field of Classification Search
CPC .. A47J 31/52; A47J 31/56; A47J 31/42; A47J 31/007; A47J 31/0573
USPC ........... 99/280, 286, 606, 617; 241/30, 89.3, 241/285.2
See application file for complete search history.

(56) References Cited

U.S. PATENT DOCUMENTS

| | | | |
|---|---|---|---|
| 4,607,200 | A | 8/1986 | Zimmerman |
| 5,660,336 | A | 8/1997 | Joseph, Jr. |
| 6,948,420 | B2 | 9/2005 | Kirschner |
| 9,119,502 | B2 | 9/2015 | Pagano |
| 9,427,110 | B2 | 8/2016 | Hoare |

(Continued)

FOREIGN PATENT DOCUMENTS

| | | |
|---|---|---|
| EP | 0690372 B1 | 3/2010 |
| JP | 04354913 A | 12/1992 |
| WO | 2009010190 A1 | 1/2009 |

(Continued)

*Primary Examiner* — Tu B Hoang
*Assistant Examiner* — Thomas J Ward

(57) ABSTRACT

A method of operating a grinder includes acts of: starting a first grinding cycle of a given duration; feeding the grinder with a given amount of material to be ground and grinding the material by rotating a rotary grinding member of the grinder for a period of active grinding; idly rotating the rotary grinding member for a period of idle rotation following the period of active grinding, for removing residual ground material from the grinder; estimating when the given amount of material has been ground, based on an operating parameter of the grinder; and adapting the given duration for a subsequent grinding cycle based on an estimated duration of the period of active grinding of the first grinding cycle.

18 Claims, 7 Drawing Sheets

(56) References Cited

U.S. PATENT DOCUMENTS

2010/0095852 A1  4/2010 Remo
2011/0155829 A1* 6/2011 Wuthrich ................ A47J 31/42
                                                    241/25

FOREIGN PATENT DOCUMENTS

WO    2011070502 A1   6/2011
WO    2011102715 A2   8/2011

* cited by examiner

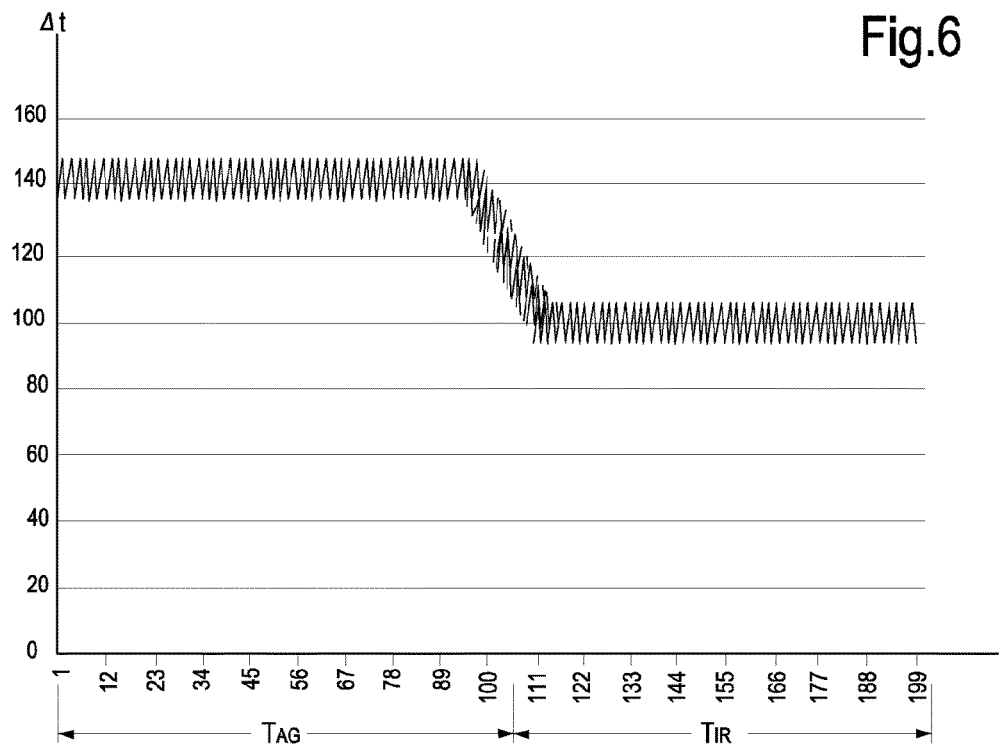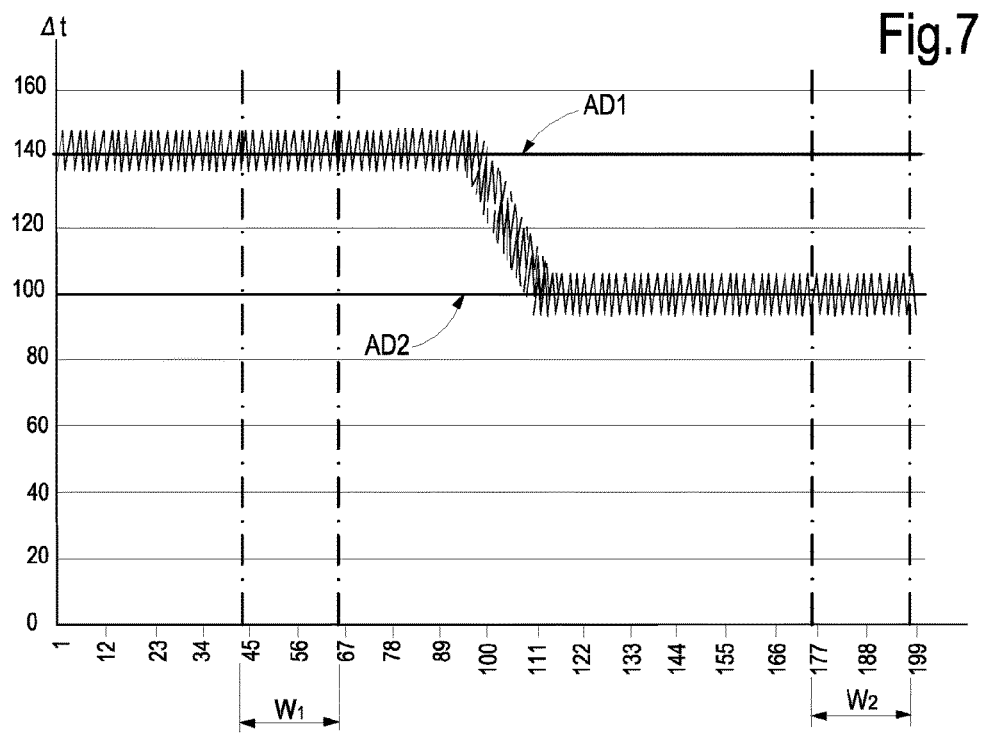

METHOD OF OPERATING A GRINDER

This application is the U.S. National Phase application under 35 U.S.C. § 371 of International Application No. PCT/IB2014/061483, filed on May 16, 2014, which claims the benefit of European Application No. 13168130.6 filed on May 16, 2013. These applications are hereby incorporated by reference herein.

FIELD OF THE INVENTION

The present invention concerns improvements to grinders, in particular, but not exclusively, grinders for grinding coffee beans. Some embodiments of the invention concern improvements to beverage producing machines, in particular coffee machines, including a grinder and specifically to methods for operating the grinder.

BACKGROUND OF THE INVENTION

Modern coffee machines in some cases include a coffee grinder, which is fed with coffee beans delivered from a fixed or removable coffee bean container. When a brewing cycle is initiated, a certain amount of coffee beans is ground to produce coffee powder. The coffee powder is loaded in a brewing chamber of a brewing unit, compacted and extracted by means of hot and pressurized water to produce a coffee-based beverage.

Some known grinding devices comprise a volumetric dosing system: the amount of coffee ground per brewing cycle is determined based on the volume of ground powder. WO 2011/070502 discloses a grinder with a dosing chamber wherein ground coffee powder is accumulated. Grinding is stopped when a sufficient amount of ground powder is accumulated in the dosing chamber. The coffee powder is then loaded from the dosing chamber into a brewing unit.

In other machines, the amount of coffee beans to be ground at each grinding cycle is determined using a dosing chamber arranged upstream of the grinder, so that a fixed amount of coffee beans is delivered to the grinder at each grinding cycle. WO 2011/102715 discloses a coffee-producing machine having a dosing chamber which is filled with coffee beans from a removable coffee container and wherefrom the coffee beans are delivered to the coffee grinder.

In some coffee machines the grinding process is performed by keeping the rotary grinding wheels or disks into rotation for a fixed time or a fixed number of revolutions, usually measured by means of a sensor arrangement, for example using one or more magnets rotating with a rotary grinding wheel or grinding disk and one or more Hall-effect sensors.

In some known machines the grinding cycle includes an active grinding period, during which the coffee beans are actually ground and reduced into powder form, and an idle rotation period, when the grinder is allowed to rotate freely in order to remove the residual coffee powder from the grinding disks, while no coffee beans are delivered from the chamber, so that if the kind of coffee used is changed from one grinding cycle to the next (e.g. shifting from regular coffee to decaffeinated coffee or vice-versa), coffee of the first type does not contaminate coffee of the second type.

The way of controlling this kind of grinding process is not satisfactory, because depending upon the actual duration of the active grinding period, an insufficient or a too long idle rotating period can sometimes be performed. If the grinding cycle is too short, the risk of contamination is not eliminated. A cycle which is too long is unsuitable as the user has to unnecessarily wait for a process to be completed, which in actual fact is useless. The efficiency of the grinding disks is hardly predictable, due both to wear, which negatively affects the efficiency of the grinding disks, as well as to the unpredictability of the process of manufacturing the grinding disks. In some situations, the efficiency of the grinding disk can be less than expected, which will result in contamination. In some cases, e.g. if at the end of a grinding cycle of pre-determined duration the grinder has still not completed the grinding of the required quantity of material due to an unexpectedly low grinding efficiency, the grinding cycle can be aborted, as the control unit wrongly interprets this situation as a lack of material in the grinder.

Accordingly there is a need for improving the method of operating a grinder, in particular a coffee grinder. Specifically, a need exists of improving the way of controlling a grinding cycle comprised of a first active grinding period and a second idle rotating period for empting the grinder before starting a subsequent grinding cycle.

SUMMARY OF THE INVENTION

The invention provides a novel method of operating a grinder, e.g. a coffee grinder, which overcomes or alleviates the drawbacks of known grinders. The object of some embodiments of the invention is to adapt the duration of a grinding cycle to the actual operating conditions of the grinder, taking into account the efficiency of the grinding members, e.g. grinding disks or cones.

According to a first aspect of the invention, a method of operating a grinder comprising at least a rotary grinding member is provided. Usually, the grinder also includes a stationary grinding member. The two grinding member are facing each other and define a grinding space there between. The grinding member(s) can be in the form of grinding wheels or grinding disks, or else in the form of grinding cones or the like. In general, within the context of the present description and attached claims, a grinding member shall be understood as any member, device, component or the like, capable of reducing the dimensions of the material to be ground. Thus, a grinding member shall be understood as being any member or component, which is capable of transforming particles of larger dimensions, e.g. coffee beans, into smaller, preferably powder-like particles, such as coffee powder.

The method provides a step of estimating or detecting when a period of active grinding ends, during said period a pre-set or given amount of material is ground. The period of active grinding is terminated when the given amount of material to be ground has been ground. The method adapts subsequent grinding cycles by changing the total duration of the grinding cycle, if needed, based on a detected or estimated duration of the period of active grinding. The duration of the grinding cycle and of sub-periods thereof, such as the active grinding period and a subsequent idle rotation period, can be expressed in terms of number of revolutions of the rotary grinding member. The end of the active grinding period can be estimated or detected directly or indirectly, based on an operative parameter of the grinder. As will be clear from the following disclosure, different parameters can be used for this purpose. The duration of the active grinding period of a grinding cycle can be estimated based on the detected or estimated moment in time when the material to be ground is run out.

In some embodiments, the operative parameter is an operative parameter of the rotary grinding member. In other embodiments, the operative parameter can be an operative parameter of a motor controlling the rotation of the rotary grinding member.

The duration of the grinding cycle can thus be adapted dynamically and taking into account the actual efficiency of the grinding member. A reduction of the grinding efficiency of the grinding member will be given consideration and will result in an adaptation of the grinding cycle duration. Also differences in the starting efficiency of the grinding member (s), due e.g. to the manufacturing process, can be given due consideration.

The method comprises the following steps:

feeding the grinder with a given amount of material to be ground and grinding said material by rotating the rotary grinding member for a period of active grinding;

idly rotating the rotary grinding member for a period of idle rotation following the period of active grinding, for removing residual ground material from the grinder, the period of active grinding and the period of idle rotation defining the grinding cycle;

estimating or detecting when the period of active grinding ends based on an operating parameter of the grinder;

adapting the duration for a subsequent grinding cycle based on an estimated duration of the period of active grinding of the first grinding cycle.

The estimation or detection of the end of the active grinding period, i.e. of the exhaustion of the material to be ground, enables determining the duration of the period of active grinding of a grinding cycle. The duration of the next grinding cycle(s) is then adapted, if needed, based on the detected or estimated duration of the previous grinding cycle.

In preferred embodiments, the operating parameter of the grinder is indicative of a variation of the rotation speed of the grinding member. Since the rotation speed of the grinding member increases rapidly when the material to be ground is exhausted, the speed variation is particularly useful in determining when grinding has been completed.

Thus, in some particularly preferred embodiments, the operating parameter of the grinder is a parameter linked to the rotation speed of the grinding member. For instance, the parameter can be the rotary speed itself. In other embodiments, the parameter can be a time delay between subsequent rotation pulses generated by a sensor arrange arrangement designed and configured for detecting the revolutions of the grinding member or a machine component rotating at a speed which is proportional to the speed of the grinding member. Thus, for example, the rotation speed of an electric motor controlling the grinding member can be used as the operating parameter.

According to preferred embodiments, the method can include the following steps: providing a sensor arrangement for detecting rotation of the rotary grinding member and generating rotation pulses corresponding to revolutions of the rotary grinding member; detecting time delays between pairs of subsequent rotation pulses. The change of the rotation speed of the rotary grinding member can thus be detected as a function of said time delays between pairs of subsequent rotation pulses.

Irrespective of how the estimation or detection of the end of the period of active grinding is obtained, the method allows adapting the total duration of the grinding cycle to the actual duration of the period of active grinding. The deterioration of the grinding efficiency of the grinding member (s) can thus be taken into consideration avoiding or alleviating the drawbacks of the prior art grinders, and ensuring an optimal duration of the grinding cycle.

According to some embodiments, a drop of the delay between subsequent pulses can be detected, said drop corresponding to an increase of the rotation speed and thus being indicative of the end of the period of active grinding.

In some preferred embodiments, to provide a more stable control of the grinder, avoiding control errors due to accidental fluctuations of the rotation speed, the method can include the step of storing at least some of the time delays between subsequent rotation pulses; and locating the change of rotation speed within the grinding cycle based on the stored time delays. The stored delay data can be processed e.g. to calculate one or more average delay values.

For example, some embodiments the method can comprise the steps of:

storing time delays between pairs of subsequent rotation pulses during a grinding cycle;

calculating a first average delay between subsequent rotation pulses within the period of active grinding;

calculating a second average delay between subsequent rotation pulses within the period of idle rotation;

calculating a threshold delay value between the first average delay and the second average delay;

locating a rotation pulse number corresponding to the threshold delay;

setting the total number of rotation pulses between the start of the period of active grinding and the rotation pulse number corresponding to the threshold delay value as the duration of the period of active grinding.

The total duration of a grinding cycle is given by the period of active grinding plus the period of idle rotation. At each grinding cycle the duration of the grinding cycle can be adapted to possibly varying operating conditions by detecting a separation point between the two different periods, namely active grinding and idle rotation. If the duration of the period of active grinding changes, a different length or duration for the subsequent grinding cycle is set. The grinder is thus operated in an adaptive manner, increasing or reducing the total duration of the grinding cycle according to needs.

The end of the period of active grinding can be detected, i.e. estimated, during each grinding cycle performed by the grinder. In other less accurate embodiments, the detection of the end of the period of active grinding can be performed only during some grinding cycles, e.g. every two or three grinding cycles.

Since the actual duration of the period of active grinding is unknown a priori, according to some embodiments, the method comprises the steps of:

setting a first detection window within the period of active grinding;

setting at second detection window within the period of idle rotation;

calculating the first average delay between subsequent rotation pulses within the first detection window;

calculating the second average delay between subsequent rotation pulses within the second detection window.

The first and the second detection windows are suitably positioned within the respective periods of active grinding and of idle rotation, so that they will never overlap with the interval where the transition from the period of active grinding and the period of idle rotation can be located.

For instance, the second detection window can be located at the end of the grinding cycle, which has a pre-determined duration. The duration of the second detection window is selected so as to last less than the period of idle rotation, for instance half the duration of the period of idle rotation, i.e.

the number of revolutions performed by the rotary grinding member during the period of idle rotation.

The first detection window can open for instance after a certain number of revolutions of the rotary grinding member after starting of the grinding cycle and can last a number of revolutions which is smaller than the minimum number of revolutions which is needed under any possible operating condition, to complete grinding of a preset amount of material. In some embodiments, an absolute minimum duration of the active grinding period can be experimentally determined. The first detection window will then be positioned and dimensioned such that it will close before the end of such absolute minimum period of active grinding.

When the method comprises calculating a first average delay and a second average delay, during the period of active grinding and the period of idle rotation, respectively, a routine for aborting the grinding cycle can be foreseen. If the amount of material to be ground is less than a minimum pre-set amount, the difference between the first average delay and the second average delay is lower than a threshold value. If this occurs, the grinding cycle is aborted.

The position of the first detection window within the expected period of active grinding can be chosen based on a minimum admissible amount of material to be ground. More specifically, considering as example the detecting and adaptation system based on the impulses number, if N is the number of revolutions theoretically required to grind a minimum admissible amount of material, below which the grinding cycle shall be aborted, the opening of the first detection window can be set at the (N+m)th rotation pulse, where m is at least 1. In this case if the amount of material to be ground is insufficient, the two average delays calculated based on the delay values stored during the first and second detection windows will be substantially the same and the grinding cycle is interrupted. "Substantially the same" means that the two values differ e.g. by not more than 10% and preferably not more than 5%.

In simple embodiments, the period of idle rotation can have a fixed duration i.e. a fixed number of rotation pulses. In other embodiments, a more accurate method can provide for an adaptive duration of the period of idle rotation. The duration of the period of idle rotation can be set so that the shorter the period of active grinding, the shorter the period of idle rotation.

The method can include a step of estimating the duration of the period of active grinding and a subsequent step of adapting the duration of the period of idle rotation for the subsequent grinding cycle based on the estimated duration of the period of active grinding.

The method is particularly useful if used for grinding coffee beans, especially (but not necessarily) in a coffee-beverage producing machine. In such an application, the method will be performed on a coffee grinder to produce coffee powder which is then loaded into an infusion unit or a coffee filter or the like.

The grinder can be controlled to perform one or more grinding cycles to provide the required amount of ground coffee. In some embodiments, a single grinding cycle will provide an amount of coffee powder sufficient for performing an infusion cycle. Nonetheless, in other embodiments, e.g. if a smaller volumetric dosing chamber is used for dosing the coffee beans to the grinder, several grinding cycles can be performed to provide a sufficient amount of coffee powder for an infusion unit.

Even though a speed-related parameter, i.e. a parameter related to the rotation speed of the grinding member, is particularly suitable for performing a method of operation as described herein, other parameters can suitably be used for this purpose. Based on the consideration that upon completion of the active grinding period, i.e. exhaustion of the material to be ground, the operative conditions of the grinding member will change, any parameter affected by or reflecting this change can be used as a control parameter for performing the method disclosed herein.

When the material to be ground is exhausted, the resistive torque applied to the grinding member, and therefore the torque to be applied by the motor to the grinding member, drops. The torque applied to the grinding member can be measured, e.g. by a torque meter. The measurement signal of a torque meter can be used as indicative of the operating conditions of the grinder. A steep change in the torque takes place at the end of the period of active grinding and can be used to control the grinder in an adaptive manner as described above. A torque meter as understood herein can be any device, member, component or arrangement suitable for detecting a torque or at least a variation of a torque transmitted to the grinding member, or else a parameter which is linked to said torque or torque variation.

According to other embodiments, an electric parameter of an electric motor driving the grinding member can also be used to perform the method disclosed herein. For instance, the current absorbed by the electric motor can advantageously be adopted as a parameter indicative of the operating condition of the grinder. Upon exhaustion of the material to be ground the resistive torque drops and consequently the power generated by the motor also drops. If the voltage is substantially constant, a power drop results in a reduction of the current absorbed by the motor. The end of the period of active grinding can be detected as a drop in the current needed to power the motor.

According to a further aspect, the invention also concerns a grinder comprising: a rotary grinding member possibly co-acting with a stationary grinding member; a motor controlling the rotation of the rotary grinding member; a control unit, programmed to perform a method as described above. The grinder can further be part of the volumetric dosing chamber, which can be interfaced with at least one container for the material to be ground, e.g. a coffee bean container.

According to yet a further aspect, the invention also concerns a beverage-producing machine, e.g. a coffee machine, including a grinder as described herein and a beverage-preparation unit, for instance a coffee-brewing unit.

Further features and advantages of the invention are set forth in the following description of exemplary embodiments thereof and in the enclosed claims, which form an integral part of the present description.

BRIEF DESCRIPTION OF THE DRAWINGS

A more complete appreciation of the invention and many of the advantages thereof will be readily obtained as the same becomes better understood by reference to the following detailed description when considered in connection with the accompanying drawings, which show one exemplary non-limiting embodiment of the invention. In the drawings:

FIGS. 6 through 9 illustrate diagrams illustrating the method of operation of the grinder;

DETAILED DESCRIPTION OF EMBODIMENTS

The following detailed description of exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

In the following description the method of the invention will be described in an application to a coffee grinder. It shall however be understood that the method can be used for operating grinders intended for grinding different kinds of products, such as but not limited to food products, whenever an idle rotation period is required to follow an active grinding period, the duration whereof can be variable and unpredictable. The method described herein allows the grinder operation to be adapted to variable operating conditions.

Figure 1:
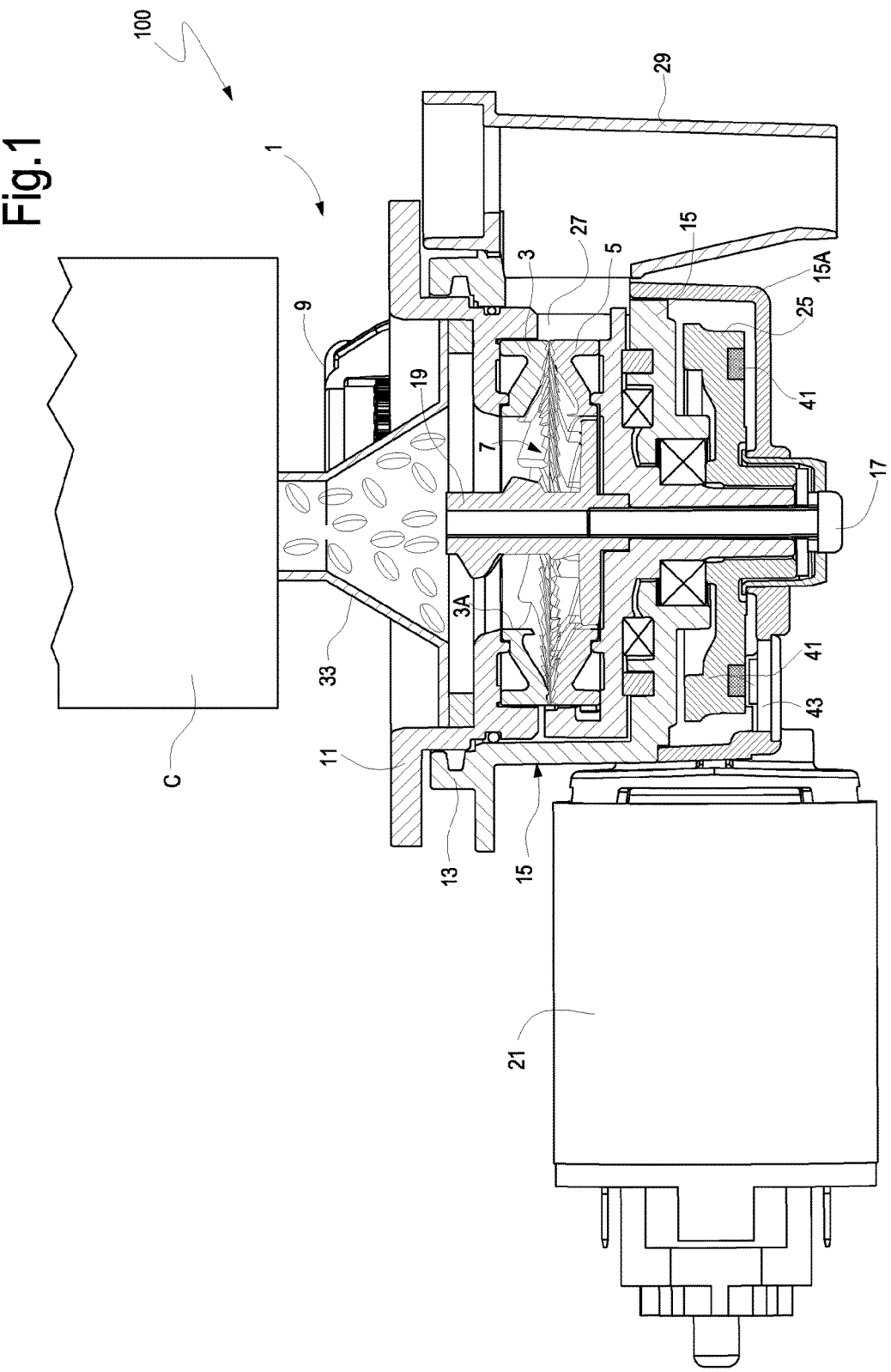
FIG. 1 illustrates a section along a vertical plane of an exemplary embodiment of a coffee bean grinder and relevant motor.

FIG. 1 illustrates an exemplary embodiment of a coffee grinder 1. The grinder 1 comprises a first stationary grinding member 3 and a second rotary grinding member 5. In the exemplary embodiment illustrated in the drawings, the stationary grinding member 3 and the rotary grinding member 5 are grinding disks or grinding wheels. In other embodiments the grinding members can be differently shaped and designed. For instance the grinding members can include grinding cones or the like. What matters is that at least one of the grinding member rotates with respect to the other. In the embodiment disclosed herein, moreover, only one grinding member is rotating, while the other is stationary. In other embodiments, both grinding members can be rotating and suitable measuring arrangements can be provided to detect rotation parameters, useful for performing a control over the grinding process, based on the principles disclosed herein. Measuring a parameter relating to only one of the two rotating grinding members would suffice to perform the method.

For the sake of clarity and conciseness, in the following detailed description reference will be made to grinding disks, one of which is stationary and the other rotating, it being understood that different grinding members and arrangement thereof can be used instead.

In some embodiments the stationary grinding disk and the rotary grinding discs are vertically superposed. The rotary grinding disk can be arranged under the stationary grinding disk.

Between the stationary grinding disk 3 and the rotary grinding disk 5 a grinding space 7 is formed. In some embodiments the grinding disks 3 and 5 comprise substantially conical active grinding surfaces facing each other. The upper, stationary grinding disk 3 has a central aperture through which coffee beans to be ground are fed to the grinder. The distance between the stationary grinding disk 3 and the rotary grinding disk 5 can be adjusted by means of an adjusting mechanism 9, known per se and not described in greater detail. Adjustment is obtained by means of a helical projection 11 formed on a unit supporting the stationary grinding disk 3 and meshing in a helical channel 13. The adjustment of the distance between the two grinding disks 3 and 5 is obtained by rotating the unit supporting the stationary grinding 3 with respect to the stationary support 15.

The rotary grinding disk 5 is rotatingly supported in the stationary support 15 and is mounted for rotation on a shaft 17. According to some embodiments, a beans advancement member 19 can be also torsionally connected to the shaft 17. The beans advancement member 19 rotates integrally with the rotary grinding disk 5 and facilitates the advancement of the coffee beans to be ground through the grinding volume between the oppositely facing active surfaces of the grinding disks 3, 5.

In some embodiments, rotation of the rotary grinding disk 5 is controlled by an electric motor 21, through a gear transmission.

The gear transmission can comprise a rotary speed adaptor, to rotate the rotary grinding disk 5 at a substantially slower rotary speed than the motor 21. The speed adaptor can be comprised of a worm 23 meshing with a gear 25 torsionally connected to the shaft 17. The motor 21 rotates the shaft 17, the rotary grinding disk 5 and the drive advancement member 19. The rotation of these members causes the delivery of coffee beans in and through the space formed between the facing conical surfaces of the stationary grinding disk 3 and rotary grinding disk 5. Reciprocal rotation movement between the two grinding disks 3 and 5 causes grinding of the coffee beans and production of coffee powder. The latter exits the grinding space between the two grinding disks 3 and 5 through a peripheral aperture 27. The coffee powder is expelled under the effect of the centrifugal force and ventilation generated by the rotary movement of the rotary grinding disk 5.

Figure 5:
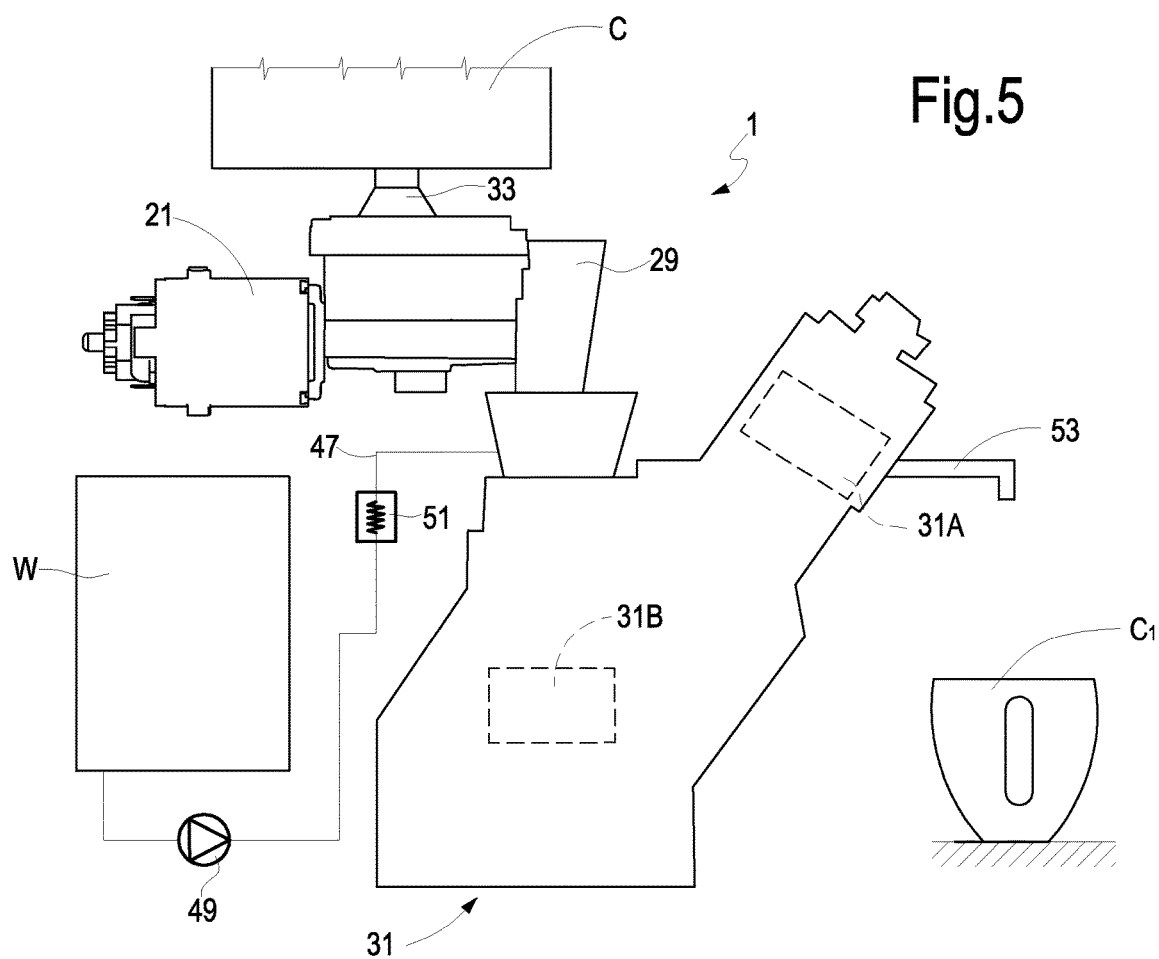
FIG. 5 illustrates a schematic diagram of a coffee-producing machine incorporating the coffee grinder.
Figure 8:
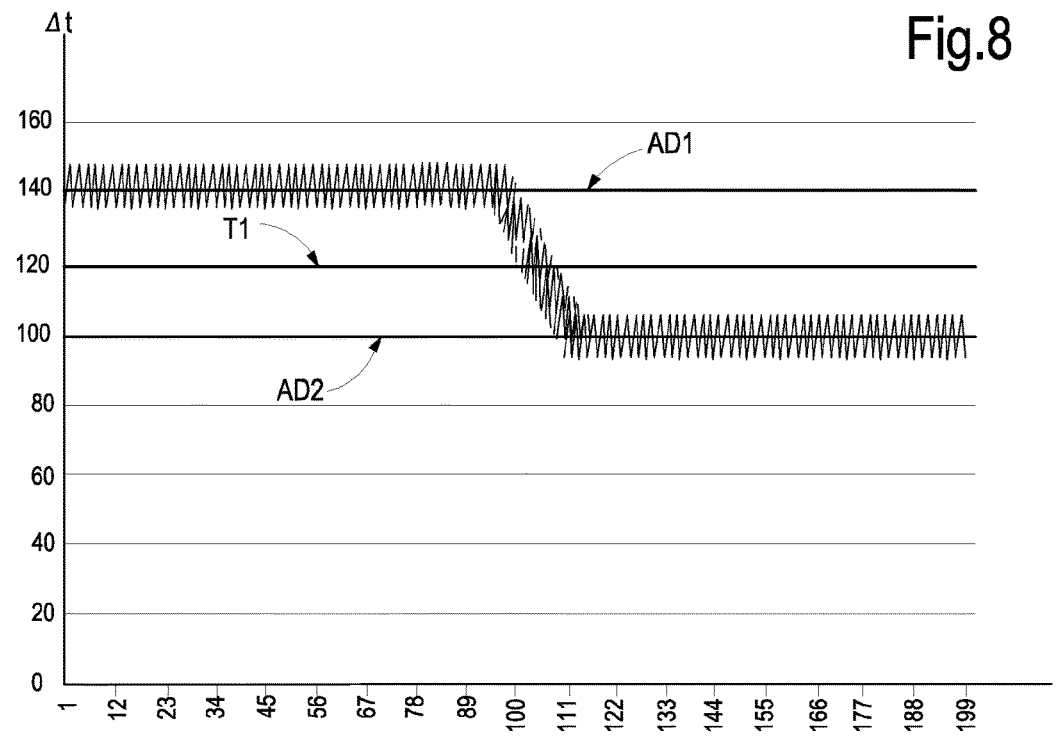

Ground coffee powder is collected in a discharge funnel 29 and delivered towards a brewing unit, schematically and partly shown at 31 in FIG. 5.

In some embodiments coffee beans can be contained in a removable container C, which is only schematically shown in FIG. 1 and which can be shaped in any suitable manner. Several coffee containers C can be provided, containing different kinds of coffee beans, e.g. regular coffee or decaffeinated coffee beans.

A dosing member can be arranged around, in or under the removable coffee container C. Coffee beans delivered by the coffee removable container C are collected in a dosing chamber 33 arranged above the stationary grinding disk 3. The amount of coffee beans to be ground at each grinding cycle can be metered volumetrically based on the volume of the dosing chamber 33.

Before starting a brewing cycle, a predetermined amount of coffee beans is loaded in the dosing chamber 33. If the volume of the dosing chamber 33 is fixed, the amount of coffee beans ground at each grinding cycle is substantially constant. Once the dosing chamber 33 has been filled with coffee beans, before the actual grinding process starts, the passage between the coffee bean container C and the dosing chamber 33 can be interrupted. A shutter (not shown) can be arranged between the container C and the dosing chamber 33. Once the shutter is closed, no further coffee beans can be loaded in the dosing chamber 33, so that at each grinding cycle only the amount of coffee beans can be ground, which can be temporarily stored in the dosing chamber 33.

The grinding cycle ends after the entire amount of coffee beans collected in the dosing chamber 33 has been ground and after a subsequent idle rotation period has elapsed, during which the rotary grinding disk 5 is idly rotated in order to expel virtually the entire amount of coffee powder remaining between the two grinding disks 3 and 5, as will be disclosed in more detail later on.

Figure 4:
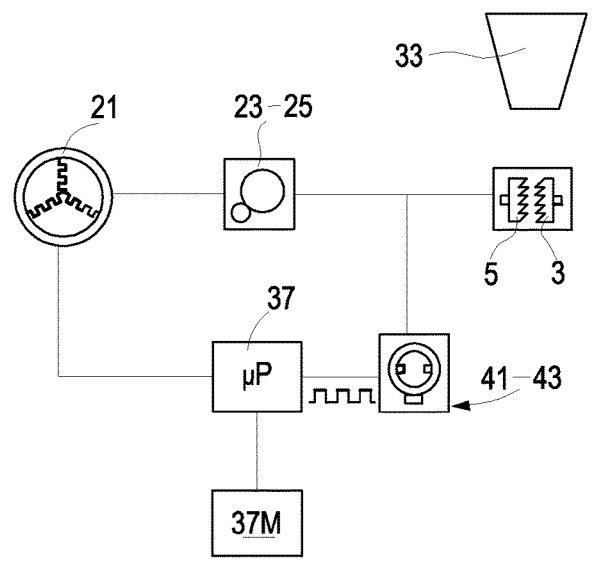
FIG. 4 illustrates a functional block diagram of the grinder.

FIG. 4 illustrates a functional block diagram of the grinder 1. In the bloc diagram of FIG. 4 the two grinding disk 3 and 5 are schematically shown in combination with a gear transmission 23, 25, the motor 21, a control unit 37, and the volumetric dosing chamber 33.

Figure 2:
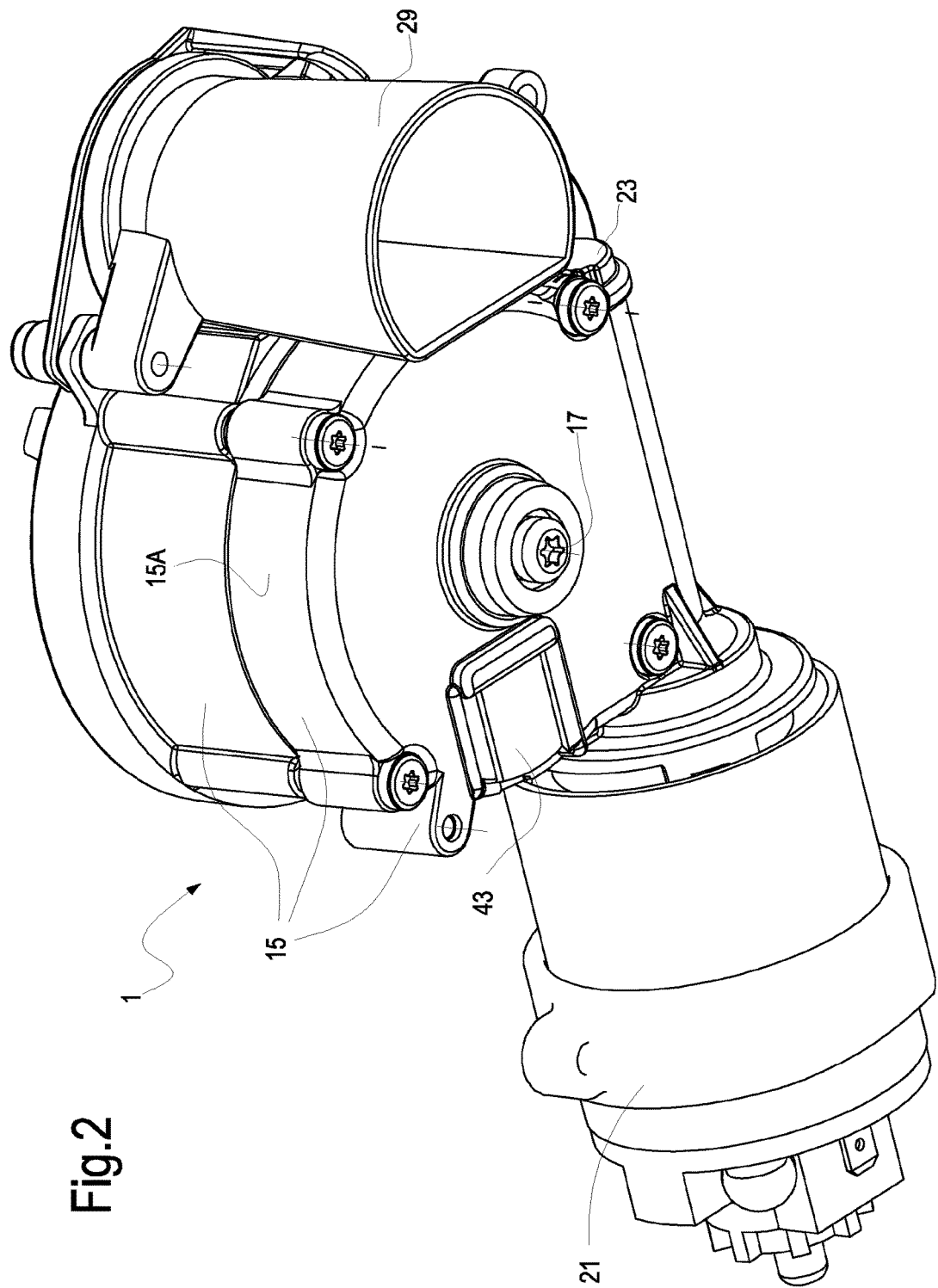
FIG. 2 illustrates a bottom axonometric view of the grinder of FIG. 1.
Figure 3:
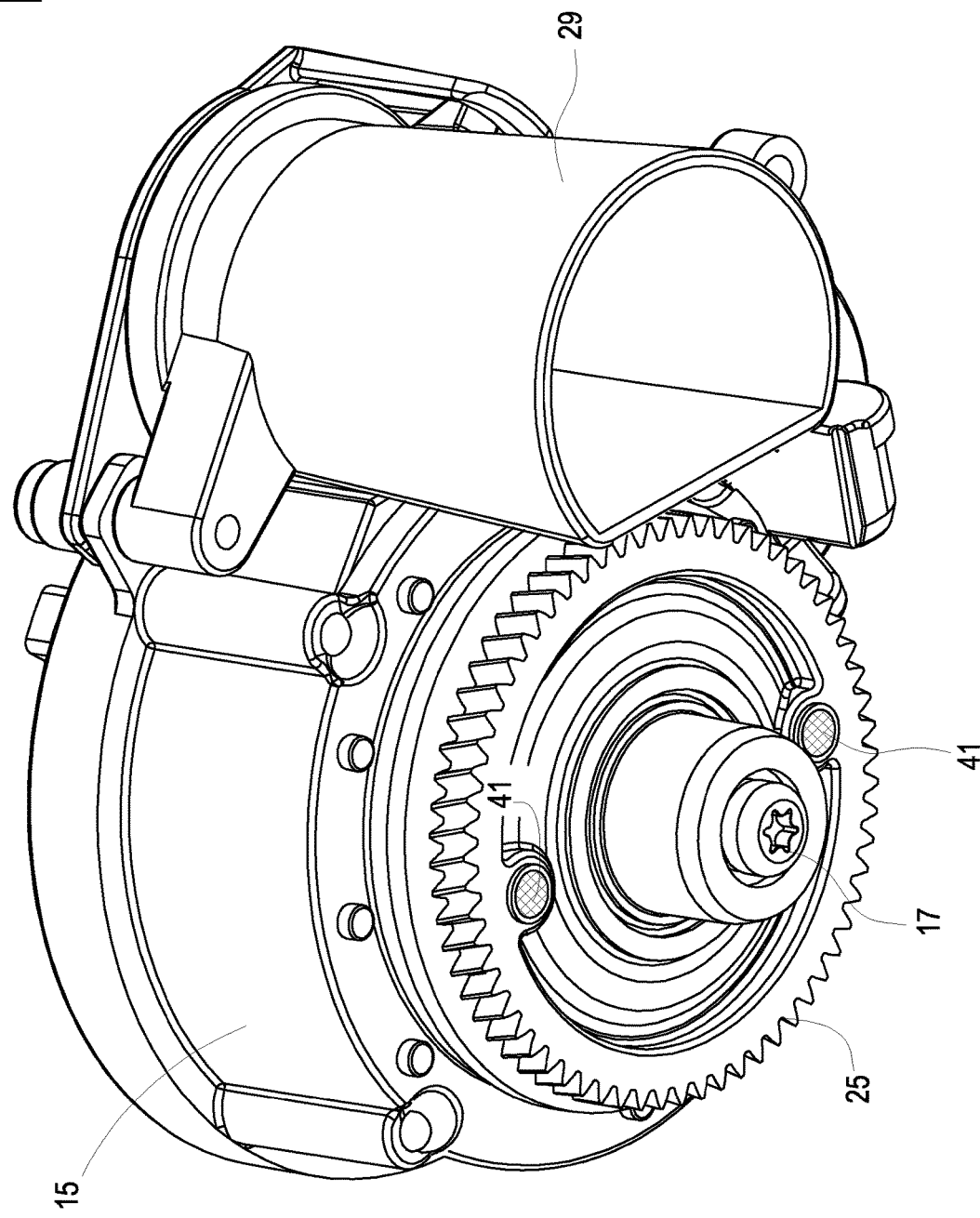
FIG. 3 illustrates a view similar to FIG. 2 with portions of the coffee grinder removed.

In order to operate and control the grinder 1, a sensor arrangement is provided to detect the number of revolutions of the lower rotary grinding disk 5. In some embodiments, as shown in FIGS. 1, 2 and 3, one or more permanent magnets 41 are arranged so as to integrally rotate with the rotary grinding disk 5. In the exemplary embodiment illustrated in the attached drawings, the magnets 41 are embedded in the gear 25 and rotate synchronously with the rotary grinding disk. One or more sensors are stationarily supported in or on the support 15, as shown in FIG. 2, where a bottom axonometric view of the grinder 1 is illustrated. FIG. 2 shows schematically a sensor 43 arranged under the gear 25. The sensor 43 can be for example a Hall-effect sensor. FIG. 3 illustrates the same grinder 1 in the same bottom view with a portion 15A of the support 15 removed to show the location of the two magnets 41 arranged in or on the gear 25. The sensor 43 detects the rotation of the gear 25 and thus of the lower rotary grinding disk 5. The sensor 43 generates a number of pulses for each revolution of the gear 25 and of the rotary grinding disk 5 corresponding to the number of magnets which rotate integrally therewith. In the exemplary embodiment shown in the drawing, two rotation pulses are generated for each revolution of the grinding disk 5 since two magnets 41 are used. In other embodiments only one magnet 41 can be used or more than two magnets can be arranged on the gear 25 or on any other component of the grinder 1, which rotates integrally with the rotary grinding disk 5, i.e. which performs the same number of revolutions as the latter.

In the schematic block functional diagram of FIG. 4 reference numbers 41, 43 represent this sensor arrangement, which provides a set or sequence of rotation pulses to the electronic control unit 37 for the purposes which will be explained in more detail later on.

The grinder 1 described so far can be arranged within a coffee machine schematically shown in FIG. 5, where only the main components of the coffee machine are schematically represented. On top of the grinder 1 the coffee bean container C is shown, together with the volumetric dosing chamber 33. The ground coffee powder is delivered to a brewing unit schematically shown at 31, which comprises a brewing chamber comprised of two mutually moving brewing chamber portions 31A, 31B. The brewing unit 31 can have any known structure and does not require specific description. The brewing unit 31 is fed with hot water delivered through a hot water duct 47. Water is pumped by a pump 49 from a water container W. The pump 49 pumps water from the container W through a water heater 51 and the hot, pressurized water is delivered through the brewing chamber of the brewing unit 31 once the ground coffee powder has been compacted in the brewing chamber, in order to extract the coffee beverage. The latter is delivered through a coffee nozzle 53 for example in a cup C1 arranged thereunder. The components, structure and operation of the coffee machine can vary depending upon the coffee machine design and are not of interest for the purpose of disclosing the present invention. Those skilled in the art will understand that differing coffee machine configurations are possible and that the teaching of the invention is not limited to one or the other of the various possible coffee machines available.

The grinding cycle performed by the grinder 1 will now be disclose in greater detail, reference being made specifically to FIGS. 6 to 9.

As mentioned briefly above, a grinding cycle is usually comprised of two main periods:

(a) a period of active grinding, during which the coffee beans collected in the dosing chamber 33 are ground and transformed into coffee powder, delivered through the funnel 29 towards the brewing unit 31;

(b) a period of idle rotation of the grinder, during which the rotary grinding disk 5 continues rotating to clean the interior of the grinder, i.e. to virtually eliminate any coffee residue therefrom before starting the subsequent grinding cycle.

The time required for grinding a fixed volumetric amount of coffee beans, determined by the volume of the volumetric dosing chamber 33, can broadly vary due to several factors. Firstly, the actual volume of the coffee beans is not constant, even though the volume of the volumetric dosing chamber 33 is fixed. The actual amount of coffee depends on the shape and dimension of the coffee beans. Therefore, the real weight of coffee beans introduced in the dosing chamber 33 can fluctuate around an average weight determined by the dimension of the volumetric dosing chamber 33. A larger amount of coffee requires a longer grinding time, i.e. a larger number of revolutions of the rotary grinding disk 5. Secondly, the efficiency of the grinding disks or wheels 3 and 5 can vary due to wear.

Additionally, in some embodiments, especially when the grinding disks 3 and 5 are made of metal and manufactured by machining, the shape of the active surface of the grinding disks 3 and 5 is not identical for all the grinding disks manufactured. This results in a variable grinding efficiency. Different grinding disk pairs can require different time to grind the same amount of coffee.

Furthermore, the distance between the two grinding disks 3 and 5 is adjustable by the user, e.g. to modify the beverage quality. This distance represents a further factor that strongly influences the grinding time required for grinding a fixed amount of coffee beans into coffee powder. The larger the distance between the grinding disks 3, 5, the larger the number of revolutions needed to grind the same amount of coffee beans.

In order to obtain a more efficient grinding cycle, the method disclosed herein adapts the total duration of the grinding cycle to optimize the cycle allowing a complete removal of coffee residues from the grinder in the shortest time possible, avoiding an unnecessarily long idle rotation of the grinder following the actual period of active grinding. It shall be understood that in the context of the present description, a duration is usually to be understood in terms of number of revolutions of the rotary grinding disk.

In some embodiments, the initial grinding cycle has a given duration expressed as number of revolutions of the rotary grinding disk 5. The control unit 37 can be programmed to perform a control algorithm which adapts the total duration of the grinding cycle (total number of revolutions of the rotary grinding disk 5) by reducing or increasing the total number of revolutions of subsequent grinding cycles, to optimize the total duration of the cycle.

In some embodiments, the method of operating the grinder comprises estimating the duration of the period of active grinding, i.e. the number of revolutions of the rotary grinding disk 5 required to grind the fixed or substantially fixed volumetric amount of coffee beans. Upon termination of the period of active grinding, a period of idle rotation is performed. In some embodiments, the period of idle rotation can be either constant, i.e. formed by a constant number of revolutions of the rotary grinding disk 5. In other embodiments, the period of idle rotation can have a variable duration, i.e. can be formed by a variable number of revolutions of the rotary grinding disk 5.

The rotation speed is slower during the period of active grinding, due to the presence of coffee beans which must be ground. Grinding requires a higher torque to be applied on the rotary grinding disk 5. Thus, the rotation speed is slower. Once the coffee beans have been completely ground, the resistive torque applied to the rotary grinding disk 5 drops. Consequently the rotation speed suddenly increases. The end of the period of active grinding can therefore be estimated based on the actual rotation speed of the rotary grinding disk 5.

In some embodiments, the method provides for detecting the delay between subsequent rotation pulses generated by the sensor 43. The time delay between subsequent pulses is a function of the current rotation speed of the rotary grinding disk 5. Thus, a sudden change in the rotation speed of the rotary grinding disk 5 is detected as a sudden change of the delay between subsequent rotation pulses generated by the sensor 43.

In other terms the delay between subsequent rotation pulses is substantially larger during the period of active grinding than during the period of idle rotation. Based on this phenomenon, in some embodiments the variation of the delay between subsequent rotation pulses is used to determine when the period of active grinding terminates.

In some embodiments, the method provides for storing in a storage memory, schematically shown at 37M in FIG. 4, the time delay between subsequent rotation pulses generated by the sensor arrangement 41, 43, starting from the instant when the grinding cycle is triggered. The time delay can be calculated by the control unit 37, e.g. by means of a clock and using the rotation pulses to start and stop time counting.

FIG. 6 schematically shows the delay values calculated by the control unit 37 based on the rotation pulses generated by the sensor arrangement 41, 43 during the grinding cycle. On the horizontal axis the number of pulses is reported. A complete revolution of the rotary grinding disk 5 generates two rotation pulses, in this example, since two magnets are provided on the rotating part of the grinder 1. On the vertical axis the time delay between two subsequent pulses is shown and expressed in milliseconds.

FIG. 6 shows that for a first time interval indicated as $T_{AG}$ the time delay is substantially constant and higher than the delay between subsequent pulses in a second time interval indicated with $T_{IR}$. The time interval $T_{AG}$ corresponds to the period of active grinding and the time interval $T_{IR}$ corresponds to the period of idle rotation. The method disclosed herein estimates the number of pulses and therefore the number of revolutions of the rotary grinding wheel 5 required to complete the period of active grinding $T_{AG}$. The total number of revolutions of the next grinding cycle(s) is adapted, if needed, based upon the number of revolutions required to complete the grinding cycle.

Adaptation can be performed as follows.

Since the time delay between subsequent pulses can fluctuate due to many factors, mainly because the material to be ground is non-homogeneous, according to some embodiments the method comprises a step of determining a first average delay AD1 which characterizes the period of active grinding $T_{AG}$. Since the actual duration of the period of active grinding is not known a priori, a detection window must be set, during which the delays between pairs of subsequent rotation pulses are taken into consideration in the calculation of the average value. In FIG. 7 a first detection window W1 is shown. The stored time intervals between pairs of consecutive rotation pulses falling within the first detection window W1 are used to calculate the first average delay AD1.

In an exemplary embodiment the detection window W1 is set between 45 and 67 pulses from the beginning of the grinding cycle, i.e. in a position which usually falls in a central portion of the period of active grinding. The reason for this choice will be explained later on.

A second average delay AD2 is calculated for the period of idle rotation. This second average delay AD2 is calculated based on values of stored delays in a second detection window W2. According to the exemplary embodiment shown in FIG. 7, the second detection window W2 is set between pulse number 177 and pulse number 199 generated by the sensor arrangement 41, 43. The second detection window W2 is located preferably as near as possible to the end of the grinding cycle. Since the method is an adaptive method, which is based on the idea of correcting the duration of the next grinding cycle, i.e. the number of revolutions of the next grinding cycle, based on values measured during a current grinding cycle of known total duration (known total number of rotation pulses), the second detection window W2 can be set at exactly the end of the grinding cycle.

As mentioned above, the method can be performed starting from a set duration of the grinding cycle, for example 200 pulses, i.e. 100 revolutions of the rotary grinding wheel or disk 5. The first window W1 is set in a central position of the period of active grinding $T_{AG}$, or to be more precise within an estimated theoretical period of active grinding $T_{AG}$, since the actual duration of the period of active grinding (i.e. the number of rotation pulses forming the period of active grinding) is unknown.

The first detection window W1 is preferably centered around a number of pulses which corresponds to the number of revolutions theoretically required to grind a minimum amount of coffee beans in order to obtain a suitable beverage. By selecting this window position, the additional function is obtained of determining whether in a given grinding cycle the amount of coffee beans collected in the dosing chamber 33 is actually sufficient or insufficient to produce an acceptable cup of coffee.

In fact, when the coffee bean container C runs out of coffee beans, the dosing chamber 33 will not be completely filled, i.e. the last dose dispensed by the container is usually less than the full amount of coffee beans required to fill the dosing chamber 33. If the amount of coffee beans delivered at the last dosing is so small that the total residual coffee beans collected in the dosing chamber 33 are ground during the revolutions before the first detection window W1, the control unit will detect this situation of lack of coffee, in a manner to be clarified later on, and can be programmed to abort the grinding cycle.

If the amount of coffee beans collected in the dosing chamber 33 at the last dose is smaller than the amount actually required to entirely fill the chamber 33, but such that during the first detection window W1 the grinder is still fed with coffee beans and therefore the detection window W1 is at least partly within the period of active grinding, the control unit 37 will complete the grinding cycle and start the brewing cycle.

The second detection window W2 is set at the end of the idle rotation period, to avoid overlapping thereof with the area of transition between the $T_{AG}$ period (period of active grinding) and the $T_{IR}$ period (period of idle rotation).

Once the first average delay AD1 and the second average delay AD2 have been calculated based on the delay values stored by the control unit 37 during a grinding cycle, according to some embodiments, the method provides for calculating a threshold value T1 based on the first and second average delay values AD1 and AD2. The threshold value T1 (see FIG. 8) can be calculated as:

$$T1 = \frac{AD1 + AD2}{2}$$

In other words, the threshold value T1 can be the average or mean value between the first average delay AD1 and the second average delay AD2.

The threshold value T1 is used as follows: delay values stored by the control unit 37, which are above the threshold value T1 belong to the period of active grinding; the delay values which are smaller than the threshold T1 belong to the period of idle rotation.

The two average delay values AD1 and AD2 can also be used to check if sufficient coffee beans are available in the dosing chamber 33, or else if the grinding cycle and subsequent brewing cycle must be aborted. As noted above, the first detection window W1 is positioned in an intermediate position of the expected period of active grinding $T_{AG}$. If the last coffee bean dose is so small that it is entirely ground before or during the first detection window W1, the cycle must be aborted. This condition is detected e.g. by calculating the difference between AD1 and AD2. If this difference is lower than a given minimum threshold, the cycle is aborted and information on "coffee container empty" is triggered, for instance.

Figure 9:
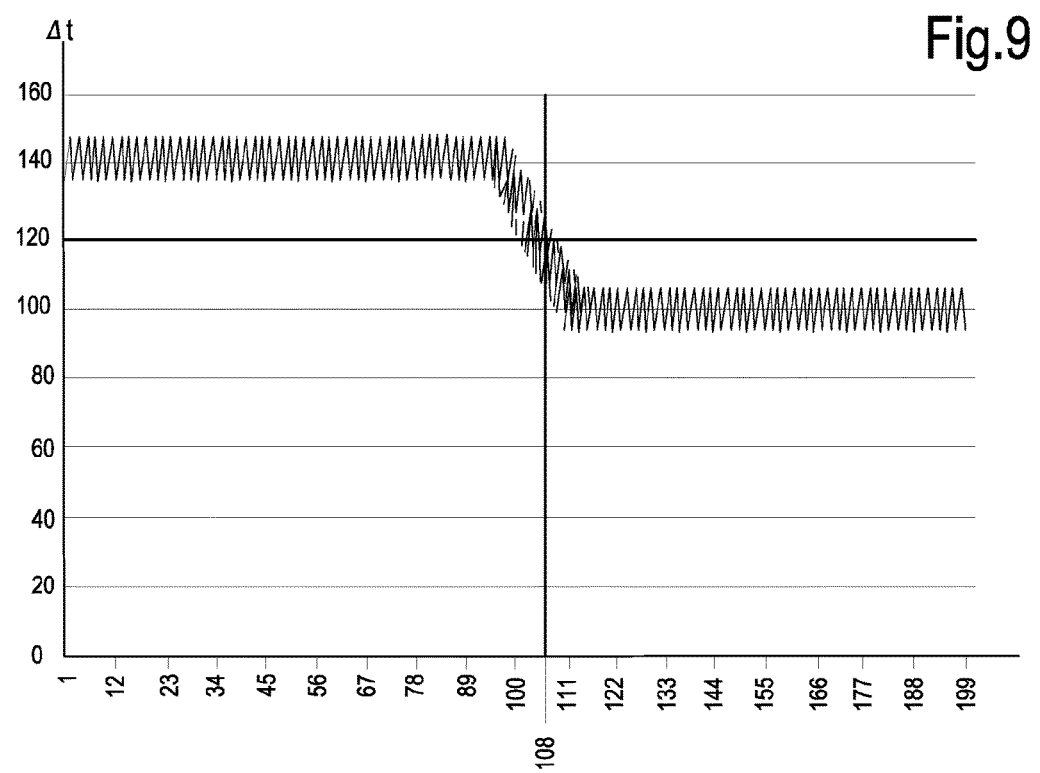

The next step of the method can be the location of the rotation pulse number corresponding to the threshold value T1, as visually shown in the diagram of FIG. 9. Based on the stored delays between subsequent rotation pulses, the control unit 37 determines which pulse number corresponds to the calculated threshold value T1. In the exemplary embodiment of FIG. 9 pulse number 108 represents the instant at which the time delay is equal to the threshold value T1.

This number represents the duration of the first phase of the grinding cycle, i.e. the duration of the period of active grinding. I.e. the period of active grinding of the current grinding cycle lasts 108 rotation pulses, which in this embodiment corresponds to 54 revolutions of the rotary grinding disk 5.

As mentioned above, the actual duration of the period of active grinding ($T_{AG}$) is unknown a priori. By means of the process describes so far the control unit 37 determines the number of pulses which correspond to the duration of the period of active grinding of the current grinding cycle. After this number of pulses (108 in the example) the entire coffee beans have been ground. The subsequent period of rotation of the grinder 1 (corresponding to the pulse interval $T_{IR}$) is the period of idle rotation.

In order to optimize the operation of the grinder 1, the control unit 37 will set a duration of the period of idle rotation so that said period will be sufficient to virtually eliminate the coffee residues from the space between the two grinding disks 3 and 5, at the same time avoiding an unnecessarily long period of idle rotation period.

In some embodiments the period of idle rotation can be constant. For example, 60 rotation pulses can be set as the standard duration of the period of idle rotation. In other embodiments, the duration of the period of idle rotation can be adapted to the detected or estimated length of the period of active grinding, i.e. to the number of rotation pulses defining the period $T_{AG}$.

By estimating the actual duration of the period of active grinding during a grinding cycle, with the above described procedure, the control unit 37 can adapt the length (expressed in number of rotation pulses) of the next grinding cycle. As will become apparent from the following example, this procedure will adapt the actual overall duration of the grinding cycle based upon the real operating conditions, avoiding unnecessarily long idle rotation of the grinder and at the same time ensuring efficient removal of coffee residues from the grinder upon every grinding cycle.

By way of example, let's assume that the control unit 37 controls the grinder 1 to perform a period of idle rotation which is constant and counts 60 rotation pulses.

Let's now consider that under certain circumstances the period of active grinding requires 180 rotation pulses. In this case the total duration of a grinding cycle will be Grinding cycle=180+60=240 rotation pulses.

If, due for example to an increase of the mutual distance between the two grinding disks 3 and 5, in a different operating condition the period of active grinding requires 70 pulses, the total duration of a grinding cycle will be Grinding cycle=70+60=130 rotation pulses.

The method described herein adapts the total duration of the grinding cycle to the total number of rotation pulses actually needed, which is determined by the time (number of pulses) required to complete grinding of the coffee beans contained in the dosing chamber 33. In the example above, once the operating conditions are changed (e.g. the user has increased the distance between the grinding disks 3, 5), the first grinding cycle will last again 240 pulses. However, the control unit 37 will determine that the actual period of active grinding is shorter than expected: 70 pulses instead of 180. The control unit will therefore adapt the length of the next grinding cycle (i.e. the total number of pulses of the next grinding cycle) reducing the number of rotation pulses.

Figure 10:
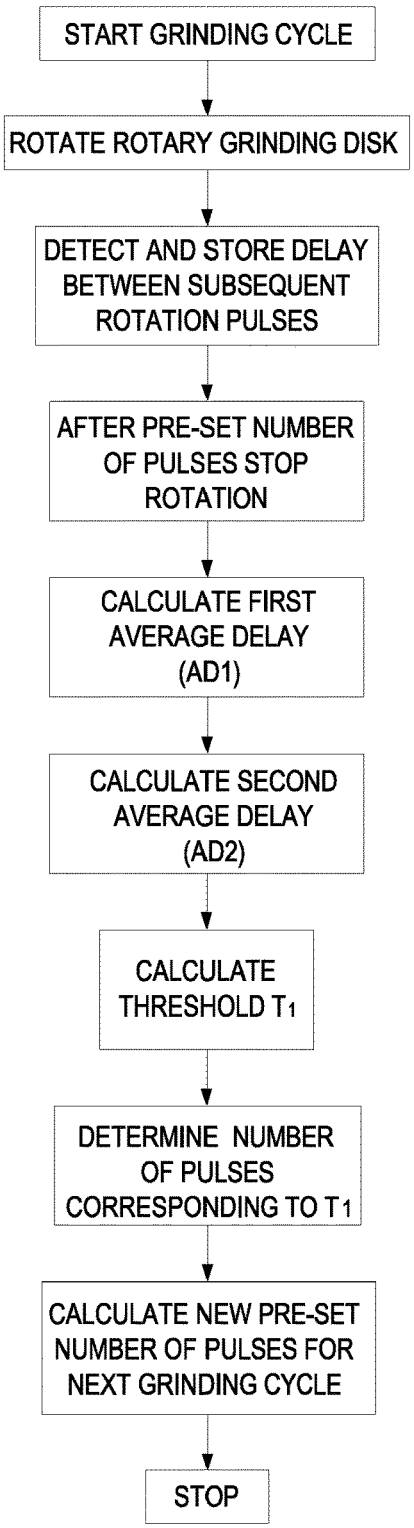
FIG. 10 illustrates a flow chart of one embodiment of the operating method of the invention.

FIG. 10 illustrates a flow chart summarizing the main steps of the method disclosed so far.

In order to avoid unstable operation of the system, adaptation can be gradual. In the above example, even though based on the detected duration of the period of active grinding the total number of revolutions should be reduced from 240 to 130 (i.e. 110 rotation pulses less), the control unit 37 will distribute the pulse difference over a certain number of steps. For example, each subsequent grinding cycle will be reduced by a fraction of the required total reduction of 110 rotation pulses, for instance by 20 pulses at every grinding cycle.

The tracking rate, i.e. the speed at which the system changes the number of revolutions for each subsequent grinding cycle, can be fixed. For instance, at each subsequent grinding cycle the control unit 37 can change the number of revolutions forming the next grinding cycle by a fixed amount. In other embodiments, the tracking rate can be determined by the mismatch between the duration of the current grinding cycle and the target duration. The larger the mismatch, i.e. the difference in terms of rotation pulses, the higher the tracking rate, i.e. the number of rotation pulses added to or subtracted from the number of rotation pulses of the previous cycle.

In some embodiments the amount of pulses added or subtracted can be different depending upon whether the system must increase or decrease the number of revolutions performed during a grinding cycle. Since too a short grinding cycle represents a critical situation, as an insufficient number of revolutions will result in an incomplete removal of coffee residues from the grinder, correction of grinding cycle duration will be faster than in the opposite case, when the actual grinding cycle duration is longer than required.

The duration of the period of idle rotation can be fixed, as mentioned above. In some embodiments, however, also the duration of the period of idle rotation can be change in an adaptive manner, depending upon the actual duration of the period of active grinding. The shorter the period of active grinding, i.e. the smaller the number of rotation pulses of the period TAG, the shorter can be the period of idle rotation, i.e. the number of pulses forming the period TIR.

The advantage obtained with the method of the present invention over the current art process of controlling the grinder operation, e.g. based on a fixed number of revolutions per grinding cycle, is clear apparent from the above description. If the grinding cycle were set to last a fixed number of revolutions, i.e. a fixed number of rotation pulses, this fixed number of rotation pulses has to be set sufficiently high to suit to any possible operating condition of the grinder 1. In the present example, assuming that 180 pulses is the maximum possible duration of a period of active grinding, the grinding cycle would, according to the current art, last always at least 240 rotation pulses. When the grinder operates in a condition where 70 pulses are sufficient to complete the grinding of the coffee beans, the grinder 1 would perform an entirely superfluous rotation lasting 110 rotation pulses. The user would in this case have to wait for a time which is unnecessary to grind the coffee and clean the grinder.

Using the adaptive method disclosed herein, this drawback is eliminated, since the grinder is capable of gradually adapting the duration of the grinding cycle to the actual operating conditions of the grinder.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. The word "comprising" does not exclude the presence of elements or steps other than those listed in a claim. The word "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of operating a grinder comprising at least a rotary grinding member, the method comprising acts of:
    starting a first grinding cycle having a duration;
    feeding the grinder with a given amount of material to be ground and grinding said material by rotating the rotary grinding member for a period of active grinding;
    idly rotating the rotary grinding member for a period of idle rotation following the period of active grinding, for removing residual ground material from the grinder, the period of active grinding and the period of idle rotation defining a grinding cycle;
    estimating when the given amount of material has been ground based on an operating parameter of the grinder; and
    adapting the duration for a subsequent grinding cycle based on an estimated duration of the period of active grinding of the first grinding cycle.

2. The method of claim 1, wherein the operating parameter of the grinder is a parameter linked to the rotation speed of the grinding member.

3. The method of claim 2, wherein the operating parameter of the grinder is indicative of a variation of the rotation speed of the grinding member.

4. The method of claim 1, comprising acts of:
    providing a sensor arrangement configured to detect rotation of the rotary grinding member and configured to generate rotation pulses corresponding to revolutions of the rotary grinding member;
    detecting time delays between pairs of subsequent rotation pulses; and
    detecting a change of the rotation speed of the rotary grinding member as a function of said time delays between the pairs of subsequent rotation pulses.

5. The method of claim 4, comprising acts of:
    storing at least some of the time delays between the pairs of subsequent rotation pulses; and
    locating the change of rotation speed within the grinding cycle based on the stored time delays.

6. A method of operating a grinder comprising at least a rotary grinding member, the method comprising acts of:
    starting a first grinding cycle having a duration;
    feeding the grinder with a given amount of material to be ground and grinding said material by rotating the rotary grinding member for a period of active grinding;
    idly rotating the rotary grinding member for a period of idle rotation following the period of active grinding, for removing residual ground material from the grinder, the period of active grinding and the period of idle rotation defining a grinding cycle;
    estimating when the given amount of material has been ground based on an operating parameter of the grinder;
    adapting the duration for a subsequent grinding cycle based on an estimated duration of the period of active grinding of the first grinding cycle;
    providing a sensor arrangement configured to detect rotation of the rotary grinding member and configured to generate rotation pulses corresponding to revolutions of the rotary grinding member;
    detecting time delays between pairs of subsequent rotation pulses, wherein a change of the rotation speed of the rotary grinding member is detected as a function of said time delays between the pairs of subsequent rotation pulses;

storing the time delays between the pairs of subsequent rotation pulses during the grinding cycle;

calculating a first average delay between the pairs of subsequent rotation pulses within the period of active grinding;

calculating a second average delay between the pairs of subsequent rotation pulses within the period of idle rotation;

calculating a threshold delay value between the first average delay and the second average delay;

locating a rotation pulse number corresponding to the threshold delay; and setting a total number of rotation pulses between a start of the period of active grinding and the rotation pulse number corresponding to the threshold delay value as a duration of the period of active grinding.

7. The method of claim 6, comprising acts of:
setting a first detection window within the period of active grinding;
setting at second detection window within the period of idle rotation;
calculating the first average delay between the pairs of subsequent rotation pulses within the first detection window; and
calculating the second average delay between the pairs of subsequent rotation pulses within the second detection window.

8. The method of claim 6, wherein the threshold delay value is calculated as a mean value between the first average delay and the second average delay.

9. The method of claim 6, wherein if a difference between the first average delay and the second average delay is below a given threshold, the grinding cycle is aborted.

10. The method of claim 1, wherein the operating parameter is one of a power required to drive the grinding member into rotation and a parameter linked to said power.

11. The method of claim 1, wherein the rotary grinding member is rotated by an electric motor and wherein the operating parameter of the grinder is an electric parameter of the electric motor.

12. The method of claim 11, wherein the electric parameter is an electric current absorbed by the electric motor.

13. The method of claim 1, wherein the operating parameter is one of a torque applied to the grinding member and a function of said torque.

14. The method of claim 1, wherein said material to be ground are coffee beans.

15. A method of operating a grinder comprising at least a rotary grinding member for grinding a given amount of material to be ground, the method comprising acts of:
starting a grinding cycle having a duration, the grinding cycle comprising a period of active grinding of the rotary grinding member and a period of idle rotation of the rotary grinding member;
estimating when the given amount of material has been ground based on an operating parameter of the grinder;
adapting the duration for a subsequent grinding cycle based on an estimated duration of the period of active grinding of the grinding cycle;
providing a sensor arrangement configured to generate rotation pulses corresponding to revolutions of the rotary grinding member;
detecting time delays between pairs of subsequent rotation pulses;
storing the time delays between the pairs of subsequent rotation pulses during the grinding cycle;
calculating a first average delay between the pairs of subsequent rotation pulses within the period of active grinding;
calculating a second average delay between the pairs of subsequent rotation pulses within the period of idle rotation;
calculating a threshold delay value between the first average delay and the second average delay.

16. The method of claim 15, comprising an act of:
locating a rotation pulse number corresponding to the threshold delay.

17. The method of claim 16, comprising an act of:
setting a total number of rotation pulses between a start of the period of active grinding and the rotation pulse number corresponding to the threshold delay value as a duration of the period of active grinding.

18. The method of claim 15, wherein the sensor arrangement is configured to detect rotation of the rotary grinding member, wherein a change of the rotation speed of the rotary grinding member is detected as a function of said time delays between the pairs of subsequent rotation pulses.

* * * * *